(12) United States Patent
Lohmann et al.

(10) Patent No.: US 7,237,645 B2
(45) Date of Patent: Jul. 3, 2007

(54) STEERING ARM FOR A WALKIE/RIDER TRUCK

(75) Inventors: Helmut Lohmann, Nartum-Gyhum (DE); Michael Niebuhr, Bargteheide (DE)

(73) Assignee: Jungheinrich AG, Hamburg (DE)

( * ) Notice: Subject to any disclaimer, the term of this patent is extended or adjusted under 35 U.S.C. 154(b) by 353 days.

(21) Appl. No.: 10/967,718

(22) Filed: Oct. 18, 2004

(65) Prior Publication Data
US 2005/0150708 A1 Jul. 14, 2005

(30) Foreign Application Priority Data
Jan. 9, 2004 (DE) ............... 10 2004 042 226

(51) Int. Cl.
*B66F 9/20* (2006.01)
(52) U.S. Cl. .......... 180/332; 180/19.1; 180/19.3; 180/315; 180/333; 180/334; 180/231; 187/231
(58) Field of Classification Search ........... 180/19.1, 180/19.2, 19.3, 315, 326, 332, 333, 334; 187/222, 231, 233; 200/61.85; *B66F 9/20*
See application file for complete search history.

(56) References Cited
U.S. PATENT DOCUMENTS
5,033,326 A * 7/1991 Powell et al. ............ 74/551.4
6,276,485 B1 * 8/2001 Eriksson et al. ........... 180/332

FOREIGN PATENT DOCUMENTS

| DE | 4413631 | | 10/1995 |
|----|---------|---|---------|
| DE | 196 01 694 A1 | * | 7/1997 |
| EP | 0 751 060 A1 | * | 1/1997 |
| EP | 0 812 799 A1 | * | 12/1997 |
| EP | 1153815 | | 11/2001 |
| EP | 1 205 429 A1 | * | 5/2002 |
| JP | 2002-484 784 A | * | 5/2002 |
| JP | 2002-137896 A | * | 5/2002 |

* cited by examiner

*Primary Examiner*—Ruth Ilan
(74) *Attorney, Agent, or Firm*—Vidas, Arrett & Steinkraus, PLA.

(57) ABSTRACT

A steering arm for a walkie/rider truck which has a truck body, a driving motor and load bearing means, a platform for the operator and a steering rod. Button portions extend adjacent both lateral surfaces of the horn of a steering above the grip portions and extend approximately parallel to the lateral surfaces and are supported for pivoting movement approximately about horizontal axes. The button portions are arranged such that they can be actuated by the thumb or the index finger of the hand engaging the associated grip portion.

10 Claims, 7 Drawing Sheets

STEERING ARM FOR A WALKIE/RIDER TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Trucks controlled by a steering arm normally are designed for a walking operation or a rider operation, respectively. For the latter case the trucks have a platform for the operator. Standing on the platform, he seizes a steering head connected to a steering rod. Trucks designed for a riding operation in most cases have a relatively short steering arm, in any case shorter than those for mere walking operation. However, it is also known to use rider trucks for the walking operation. In this case, the platform is arranged at the rear side of the truck. The operator may stand on the platform and grasps the steering head with one hand for actuation purposes while the other hand grasps a retaining bail which extends above the housing of the truck. Such a truck is known from the U.S. patents U.S. Pat. No. 6,464,025, U.S. Pat. No. 5,245,144, U.S. Pat. No. 5,964,313 or U.S. Pat. No. 6,382,359. The steering arm includes a steering rod which can be pivoted about a horizontal axis, and concurrently is supported for rotation about a vertical axis in order to effect a steering motion on the wheel to be steered. A steering head is attached to the upper end of the steering rod which typically is symmetrical to the longitudinal axis of the steering rod. The steering head includes a transverse portion or support portion which extends transverse to the steering rod. A horn extends centrally from the transverse portion to the rear. Rod-shaped grip portions are located on both sides of the horn which are spaced to a transverse portion and extend proximately parallel to the transverse portion. The grip portions are supported for rotation about their longitudinal axis. The rotational bearing of the grip portion takes place at their inner end at the horn and at the outer end at leg portions which approximately extend parallel to the horn and are connected to the transverse portion. Such a structure of a steering head is not only known from the above mentioned publications, rather is known from steering arms of similar trucks. The rotation of the grip portions have the function to actuate the driving motor or the control circuit thereof, respectively. The driving speed corresponds to the rotational angle of the grip portions. The grip portions either are mechanically or electrically coupled, so that it makes no difference which of the grip portions is actuated.

The described trucks also need a driving means for the raising and lowering of a load bearing means which normally is a load carrying fork. The control of the load bearing means also takes place at the steering head. In the above mentioned publications the upper side of a steering head has a key-element arrangement for the actuation of the drive means for lowering or raising of the load bearing means. From EP 1 153 815 A1 a steering head has become known wherein grip portions are rigid, and a rotary driving switch is located between the horn and the adjacent ends of the grip portions. From U.S. Pat. No. 5,595,259 it has become known to provide the grip portions to actuate a driving switch and to provide extensions (paddle) at the ends thereof, whereby the rotational actuation during walking operation is to be facilitated. From DE 4 413 631 A1 it is known to provide keys or push-buttons between the horn and the grip portions to effect the raising and lowering of the load bearing means.

It is an object of the invention to provide a steering arm for the walkie/rider trucks wherein independent of the angular position of the steering arm and independent of whether the operator rides or walks an ergonomic favourable actuation of the driving motor and the drive for the raising and lowering operation can be achieved.

BRIEF SUMMARY OF THE INVENTION

On the steering arm according to the invention key-elements or push-buttons are arranged adjacent to both side surfaces of the horn above the grip portions. The key-elements extend parallel to the axis of the horn. The key-elements can be actuated by the thumb or the index finger of a hand grasping the associated grip portion. The key-elements are supported by the horn for movement approximately about a horizontal axis. The key-elements extend forwards and rearwards beyond the grip portions whereby they can be also operated from the lower side of the steering head with the thumb or the index finger. Spring means bias the key-elements into a neutral position. A switch arrangement is associated with the key-elements which is actuated by a pivoting of the key-elements in order to control a raising/lowering control device for the load bearing means. The switch arrangement can be integrated in the horn and for example actuated by shafts of the key-elements. However, it is also conceivable to provide actuation elements or switch contacts at the outside of the horn which are in turn actuated by portions of the key-elements or actuators.

When in the foregoing and the following it is spoken of "upper" and "lower" with respect to the steering head, this means the orientation of the steering head or the steering rod, respectively if inclined to the vertical. It is understood that a steering rod extending vertically is no more exactly covered by the above definition. In this case the upper side of a steering head corresponds to the front side and the lower side to the backside. Anyhow, it is possible to also actuate the truck with a vertically extending steering rod.

According to an embodiment of the invention it is particularly advantageous if the key portions or buttons are formed on an integral lever which as a kind of rocker is pivotably supported between the ends thereof at the associated lateral surface of the horn.

A feature of the invention is that the key portions or the rocker may be also actuated from the lower side of the steering head. In case of normal push-buttons or key-elements, an actuation from above or below may control the same function, e.g. a raising or a lowering. This of course is not the case with a rocker. If a rocker is actuated from below on one end from the lower side this corresponds to the same function if the rocker is actuated from above at the other end.

In case a rocker is used according to a further embodiment of the invention it is advantageous if the rotary direction for the grip portion on one hand and the pivoting direction of a rocker on the other hand, is the same. For example, the grip portion can be rotated away from the operator standing on the platform for forward driving. This corresponds to a situation wherein the load bearing means pick up a pallet. A pivoting of the rocker in the same rotary direction results in a lowering of the load bearing means. If, however, the load bearing means is removed from the pallet, the grip portion must be rotated in the opposite direction, i.e. towards the operator. A pivoting of the rocker in the same direction results in a raising of the load bearing means.

BRIEF DESCRIPTION OF THE SEVERAL VIEWS OF THE DRAWINGS

An embodiment example is subsequently described along accompanying drawings wherein.

DETAILED DESCRIPTION OF THE INVENTION

Figure 1:
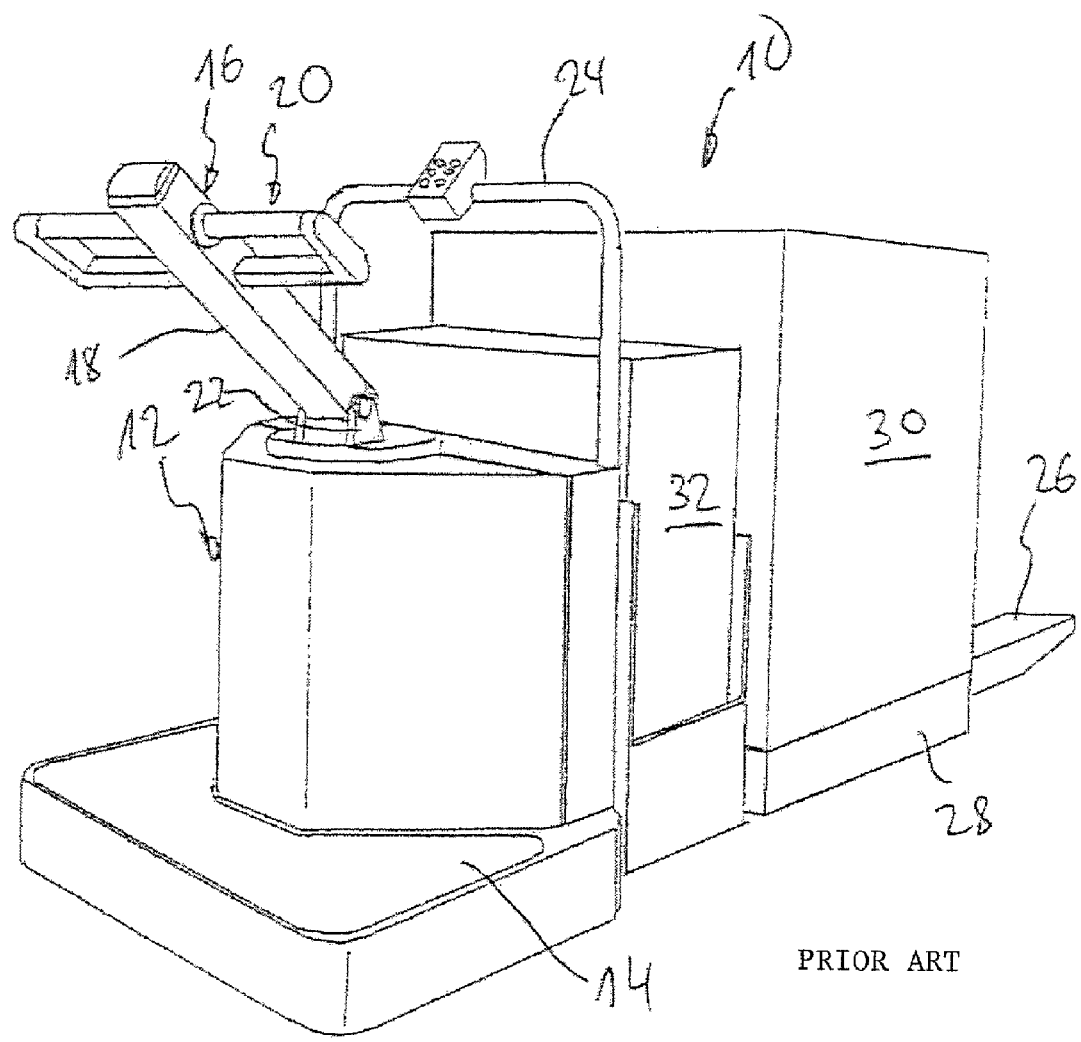
FIG. 1 shows a diagrammatic view of a walkie/rider truck according to the prior art.

While this invention may be embodied in many different forms, there are described in detail herein a specific preferred embodiment of the invention. This description is an exemplification of the principles of the invention and is not intended to limit the invention to the particular embodiment illustrated FIG. 1 shows a walkie/rider truck 10 which for example has become known by U.S. Pat. No. 6,382,359 B1. It includes a truck body 12 having a platform 14 at the rear for an operator. A steering arm 16 is linked to the upper side of the truck body 12 and has a steering rod 18 and a steering head 20. The steering arm 16 is supported for pivoting movement about a horizontal axis at the upper side of body 12 as shown at 22. Furthermore, steering arm 16 can be rotated about a vertical axis in order to steer the steerable wheel (not shown) of truck 10. A reverse U-shaped retaining bail 24 is arranged above the upper side of body 12 and adapted to allow the operator to seize if he stands on platform 14. The operator may stand on the left or right side of platform 14 depending upon whether he is right- or left-handed. If he stands on the right side, he seizes bail 24 with his right hand and actuates the steering head 20 with his left hand. If he stands on the left side of the platform 14, it is vice-versa.

On the front side of the truck a load bearing means in form of a load carrying fork is located as can be seen at tine 26. The load fork picks up a pallet 28 upon which a load 30 is positioned. A battery 32 is located between the load bearing means and the truck body 12.

The truck 10 includes a driving motor (not shown) which is controlled from the steering head 20. Furthermore, drive means for raising and lowering the load bearing means are provided. Such drive means are also not shown. No details are to be explained. They are generally known for example by the U.S. Pat. No. 6,382,359 B1 or the other prior art mentioned above.

A steering head 40 as shown in FIGS. 2–13 is different relative to steering head 20 shown in FIG. 1. It is connected to a steering rod which approximately corresponds to steering rod 18. Also the remaining parts and functions which are controlled from steering head 40 correspond to that of FIG. 1.

Figure 3:
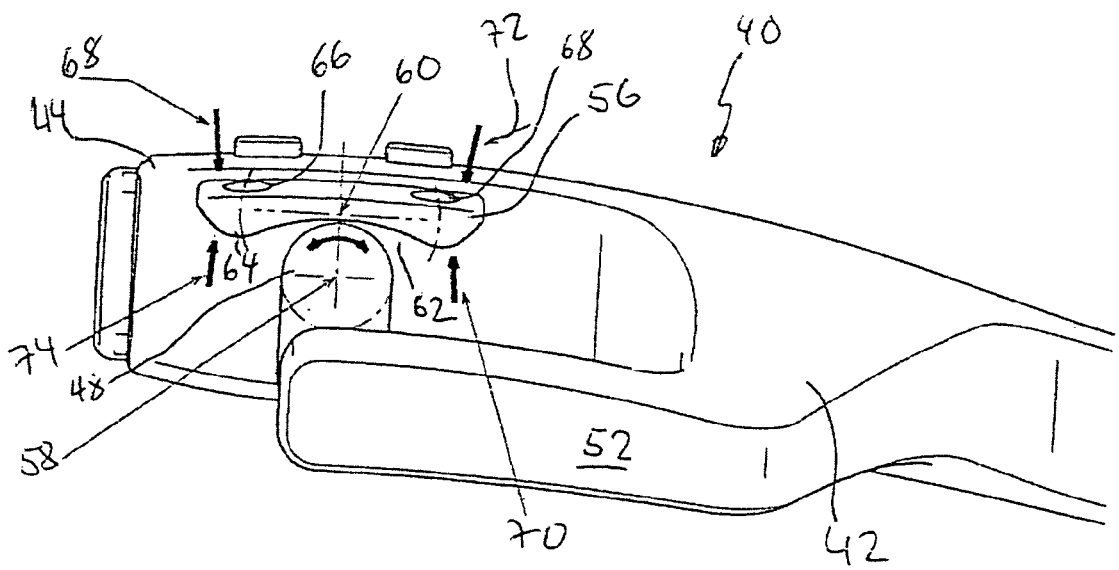
FIG. 3 shows a steering head according to FIG. 2 in a lateral view.

The steering head 40 includes a transverse portion 42 which is connected with the steering rod not shown and the transverse portion 42 extends transverse to the longitudinal axis of the steering rod. Towards the ends it is narrower if viewed from above and also from lateral. Furthermore, its upper side is convex as can be seen in FIG. 3. The upper side or surface of the transverse portion 42 descends outwardly. In the center on the side opposite to the steering rod, a horn 44 is positioned having an axis which is approximately aligned with the longitudinal axis of the steering rod. Horn 44 has a slightly convex upper surface and approximately plane lateral surfaces. Rod-shaped grip portions 46, 48 are located on opposite sides of horn 44. The grip portions 46, 48 extend approximately parallel to transverse portion and are spaced therefrom.

Figure 2:
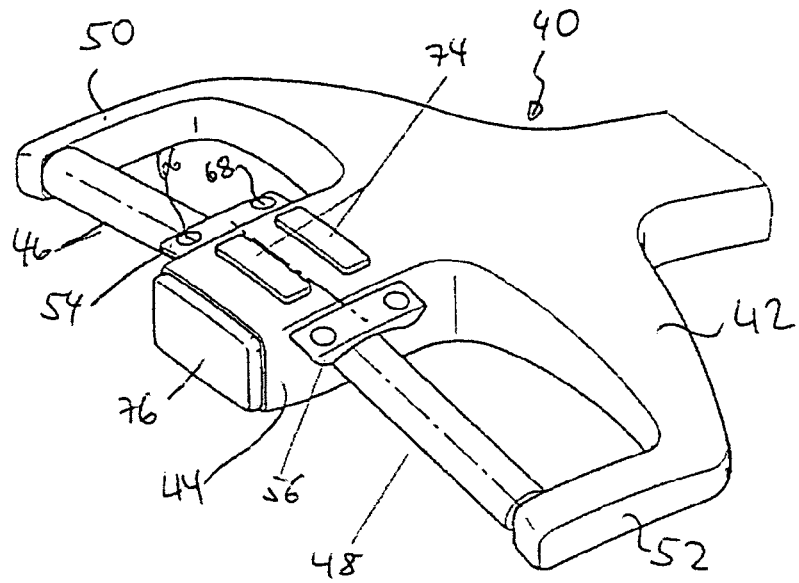
FIG. 2 shows diagrammatically a steering head according to the invention from above.

As can be seen in FIGS. 2 and 3 or also 6 and 7 the grip portions 48 descend outwardly. With the outer ends the grip portions are supported for rotation by leg portions 50, 52. The leg portions 50, 52 extend approximately parallel to horn 44 and define grip openings together with horn 44, the grip portions 46, 48 and the transverse portion 42. The grip portions 46, 48 are supported for rotation at the lateral surfaces of horn 44. The grip portions 46, 48 control a control device for the driving motor (not shown). For example, a rotation of the grip portion 46, 48 towards the steering rod results in a forward movement and a rotation in the opposite direction in a rearward movement of the truck. This corresponds apparently to the driving direction of the truck.

Rockers 54, 56 are supported for a pivoting movement on both sides of horn 44 adjacent to the lateral surfaces thereof. The pivoting axis extends approximately parallel to the rotational axis of the grip portions 46, 48. In FIG. 3 the axis of grip portions is indicated at 58 and the pivoting axis of the rocker 56 is at 60. It can be seen that the pivoting axis 60 is above axis 58 most adjacent to grip portion 48. However, it is not mandatory that the axes 58, 60 are parallel.

The rockers 54, 56 for example have a shaft which extends into the interior of horn 44 in order to actuate a switch arrangement therein which controls the control device for raising or lowering load bearing means of the truck. The rocker 54, 56 is biased into an intermediate neutral position by a spring arrangement not shown. The upper side of the rockers is adapted to the course of the upper side of horn 44 while the lower side between the ends thereof is concave as shown at 62. The ends of the lower side are spherical at least in lateral view.

In FIG. 3 an actuation surface for rockers 54, 56 is indicated by circles 66, 68. Also the lower convex or spherical portions 64 define actuation surfaces which are to be explained in more detail below.

In FIG. 3 it is determined that a pivoting of rocker 56 opposite to the clockwise direction i.e. actuation of the direction of arrow 68 or 70 results in a raising of the load bearing means. Conversely, a pivoting of rocker 56 in clockwise direction corresponding to arrows 72, 74 results in a lowering of the load bearing means. It can be seen that the actuation of rocker 56 at one arm may result in a raising and a lowering as well. Furthermore, the rocker can be actuated from below in order to effect a raising or a lowering.

In order to actuate rocker 54, 56 from above and also from below, the lever which defines rocker 54, 56 must be elongated so that it sufficiently extends beyond the associated grip portion 46, 48. In order to avoid undesired actuation, the upper side of rocker 54, 56 is slightly below the upper surface of horn 44. Further, the ends of rocker 54, 56 have a significant distance from the end of horn 44.

From the allocation of the movements of grip portion 46, 48 on one side and of rockers 54, 56 on the other side according to FIG. 3 it is clear that a pivoting of rocker 54, 56 in the same direction as the rotation of grip portion 54, 56 results in a lowering of the load bearing means. Conversely, the rotation of grip portion 46, 48 in the opposite direction results in a raising motion if rocker 54, 56 is actuated in the same direction. This is an apparent allocation if regarding the operation of the truck when taking up or unloading a pallet.

In FIGS. 2–13 an integral rocker is shown. It is understood that the rocker can be separated so that two button portions are located on each side of horn 44, with the button portions being actuated in the same manner as shown for the rocker according to FIGS. 2–13. If button portions are provided, they could be defined for example by levers having one arm.

As can be seen, the steering head 40 according to FIGS. 2–13 is symmetrical to the longitudinal axis of the steering rod not shown, and the elements to actuate the functions of the truck are co-effective on each side of the symmetric axis. This can be achieved by a mechanical or electrical coupling.

As already mentioned above, it is spoken of the upper and the lower side of steering head 40. This refers to the geometry of the steering head 40 in an orientation inclined to the vertical as for example shown in FIG. 1. The steering arm can be also positioned upright, and the described characterization is maintained, although then the upper side of the steering head is the front side for example.

On the upper side of horn 44 two buttons 74 for further functions of the truck not shown are provided. On the rear side of horn 44 a button 66 is provided as a protection against approaching.

Figure 4:
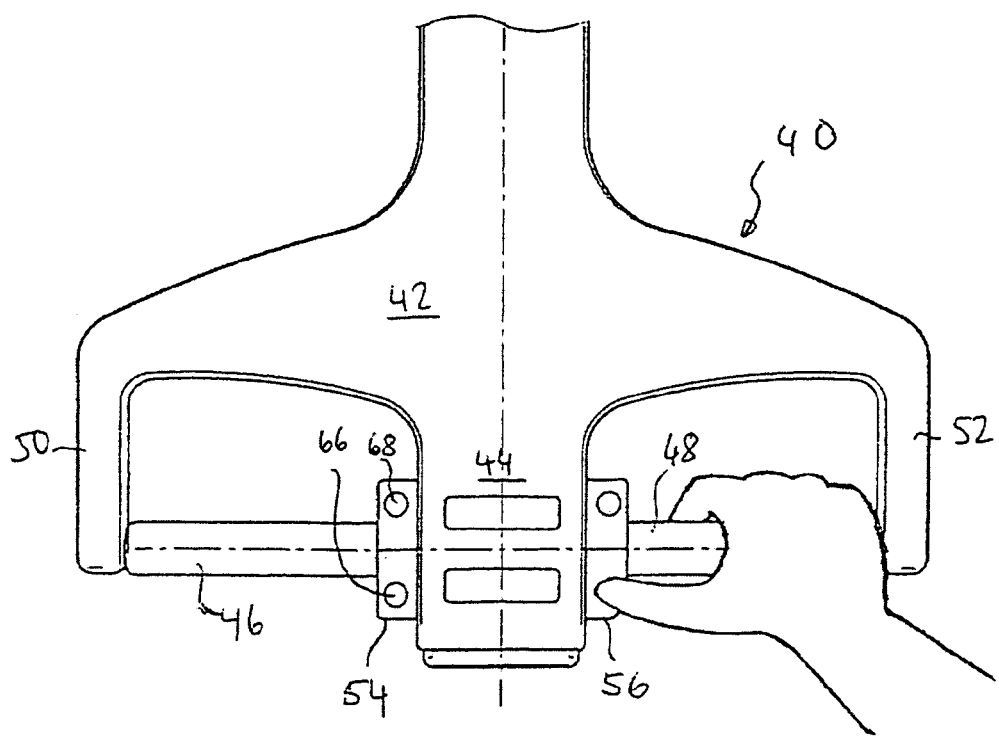
FIG. 4 shows a view on the steering head of FIG. 2 for the walking operation during actuation of the raising function.
Figure 5:
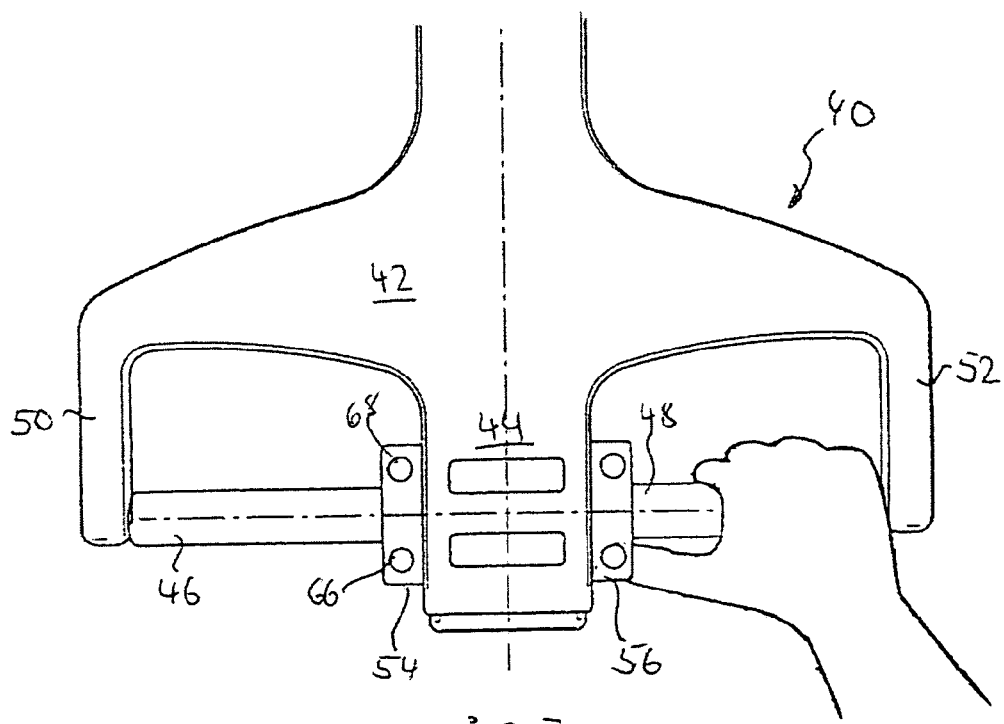
FIG. 5 shows a similar illustration as FIG. 4 during actuation of the lowering function.
Figure 6:
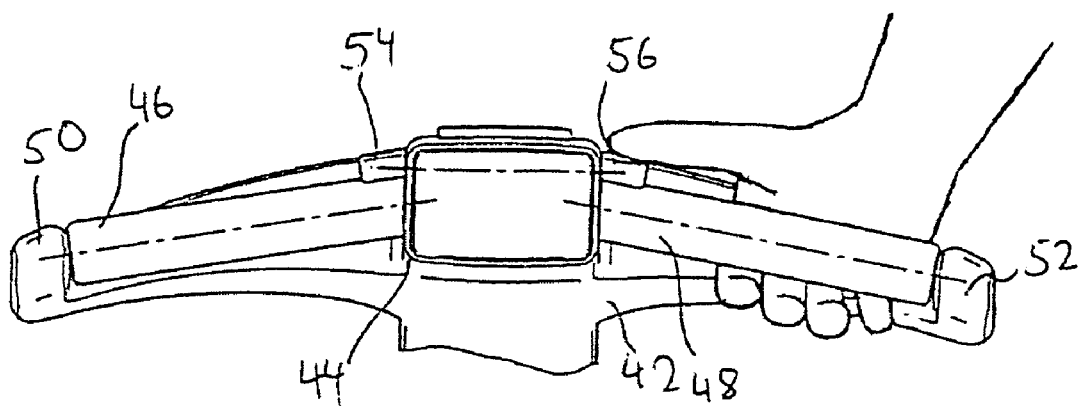
FIG. 6 shows the backside of the steering head of FIG. 4 in the same attitude of the operator.
Figure 7:
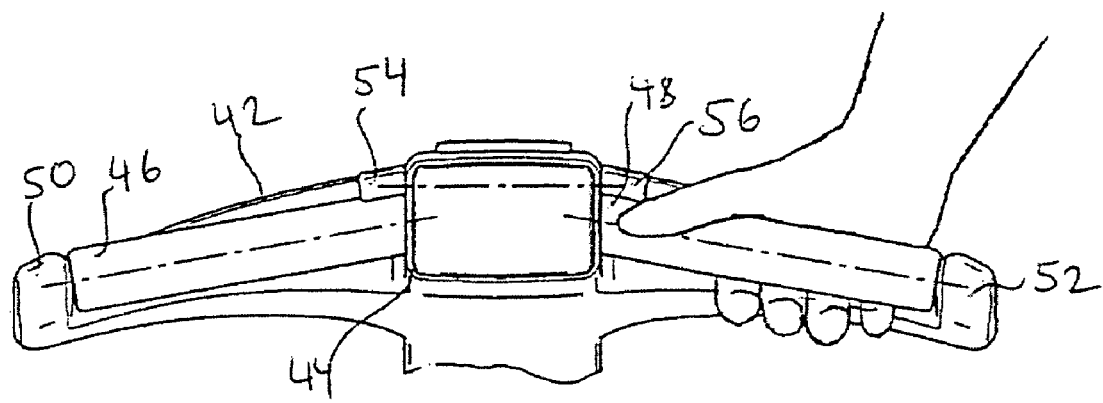
FIG. 7 shows the backside of the steering head of FIG. 5 in the same attitude of the operator.

In FIGS. 4–11 the steering head 40 of FIGS. 2 and 3 is shown when actuated for the walking operation. In this operation, the operator stands or goes behind the truck e.g. truck 10 with the steering arm having an orientation as shown in FIG. 1. In FIGS. 4 and 5 it is illustrated how the right hand of the operator not shown engages the grip portion 48 and contemporaneously actuates with his thumb the associated end of rocker 56 whereby a raising of the load bearing means is effected. In the illustration of FIG. 5 the right hand of the operator engages grip portion 48 while his thumb engages the associated end of rocker 56 from below i.e. in direction of arrow 74 of FIG. 3. Thereby, the lowering function of the load bearing means is effected. In FIG. 6 the rear view of FIG. 4 is shown with same actuation of rocker 56 and FIG. 7 shows the rear view of the illustration of FIG. 5 for the same actuation. As can be seen, the operator must not leave the grip portion 48 if he intends to actuate rocker 56. By the way, in FIGS. 6 and 7 it can be seen that the rotational axes and the pivot axes of the grip portions 56, 58 on one side and of rockers 54, 56 on the other side must not have the same direction. They are shown with dotted lines in FIGS. 6 and 7.

Figure 8:
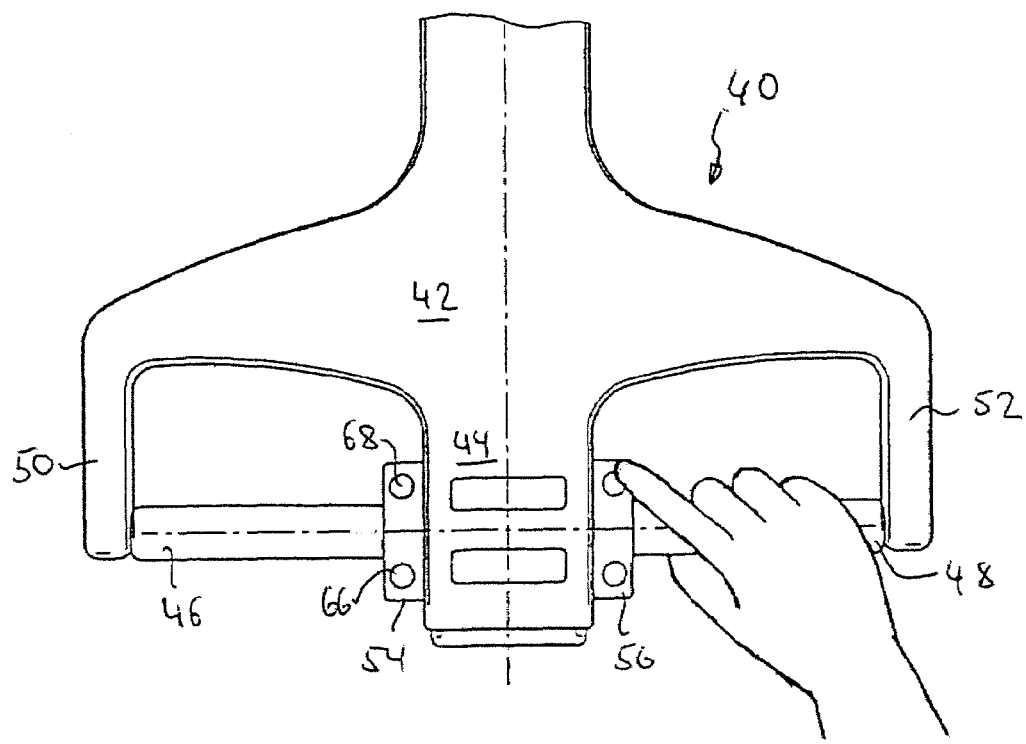
FIG. 8 shows the view on the steering head of FIG. 2 in a different attitude of the operator during the lowering function.
Figure 9:
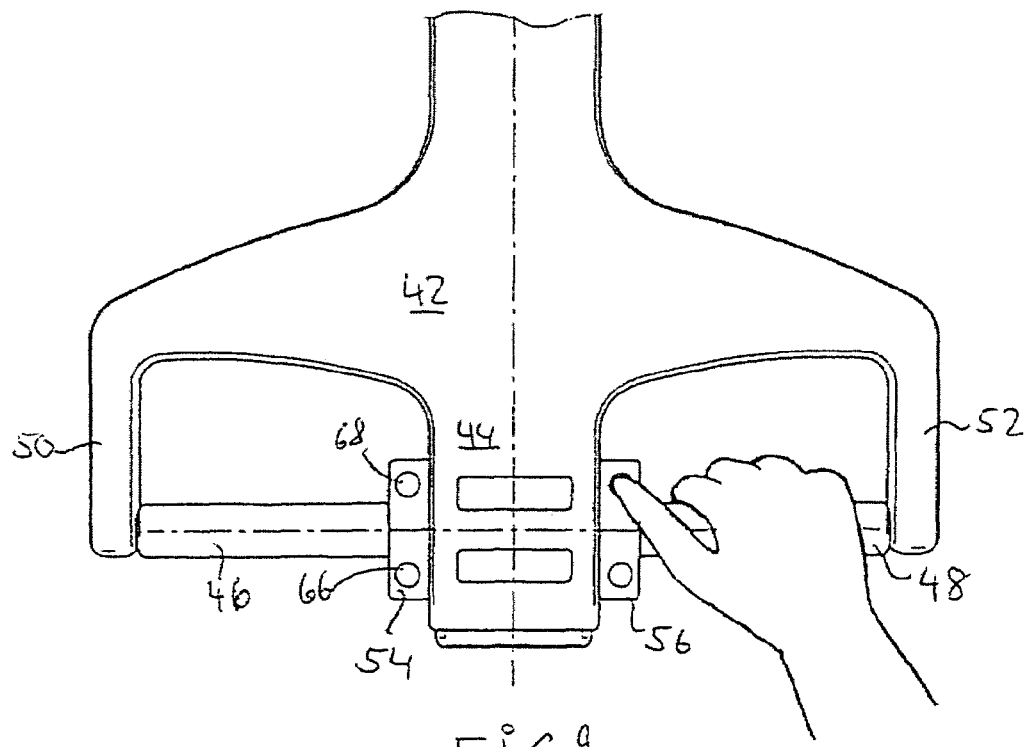
FIG. 9 shows an alternative illustration for the actuation of the steering arm relative to FIG. 8.

In FIGS. 8 and 9 the different actuation of rocker 56 is illustrated for the lowering function. In FIG. 8 the front upper actuation surface 58 is engaged by the index finger of the right hand which engages grip portion 58. In FIG. 9 the thumb of the hand engaging grip portion 58 actuates the inner actuation surface 68.

Figure 10:
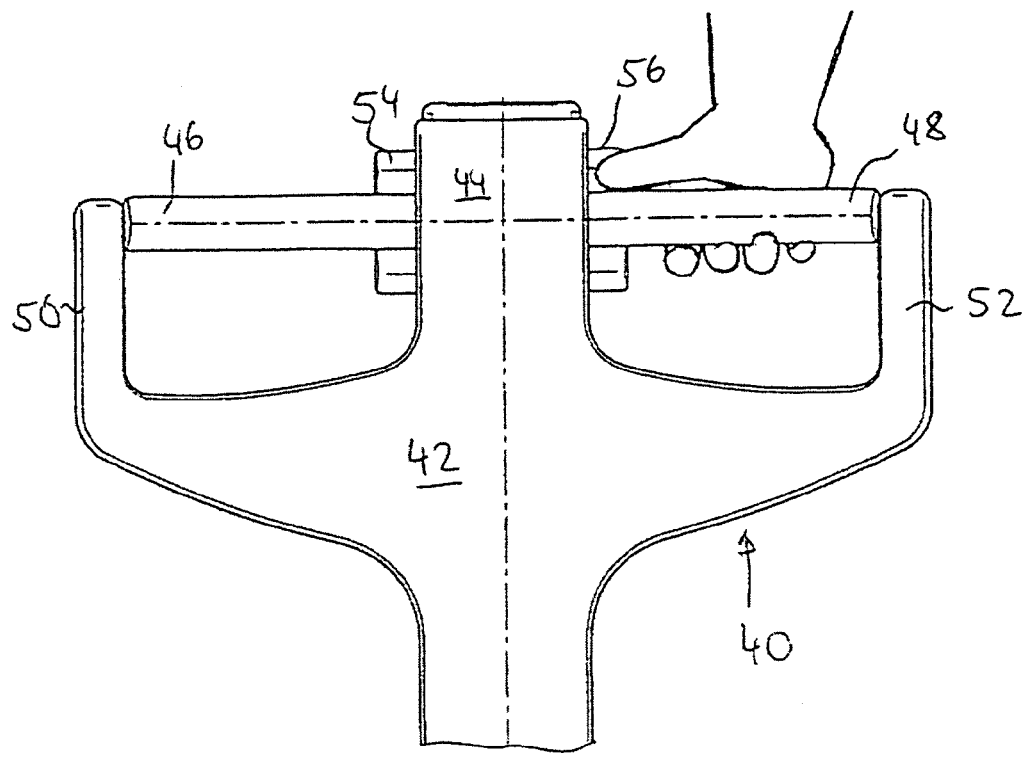
FIG. 10 shows the actuation of a steering head with an upright standing steering arm according to FIG. 2 for the lowering function.
Figure 11:
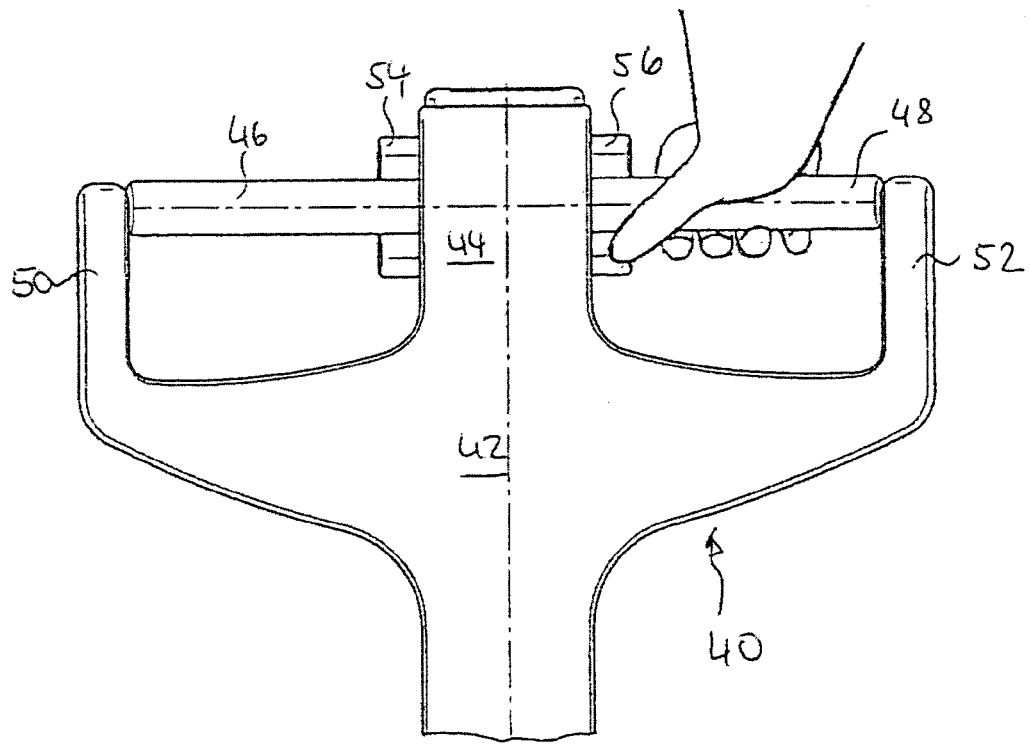
FIG. 11 shows the actuation of the steering head of FIG. 2 with a vertical position of the steering arm for the raising function.
Figure 12:
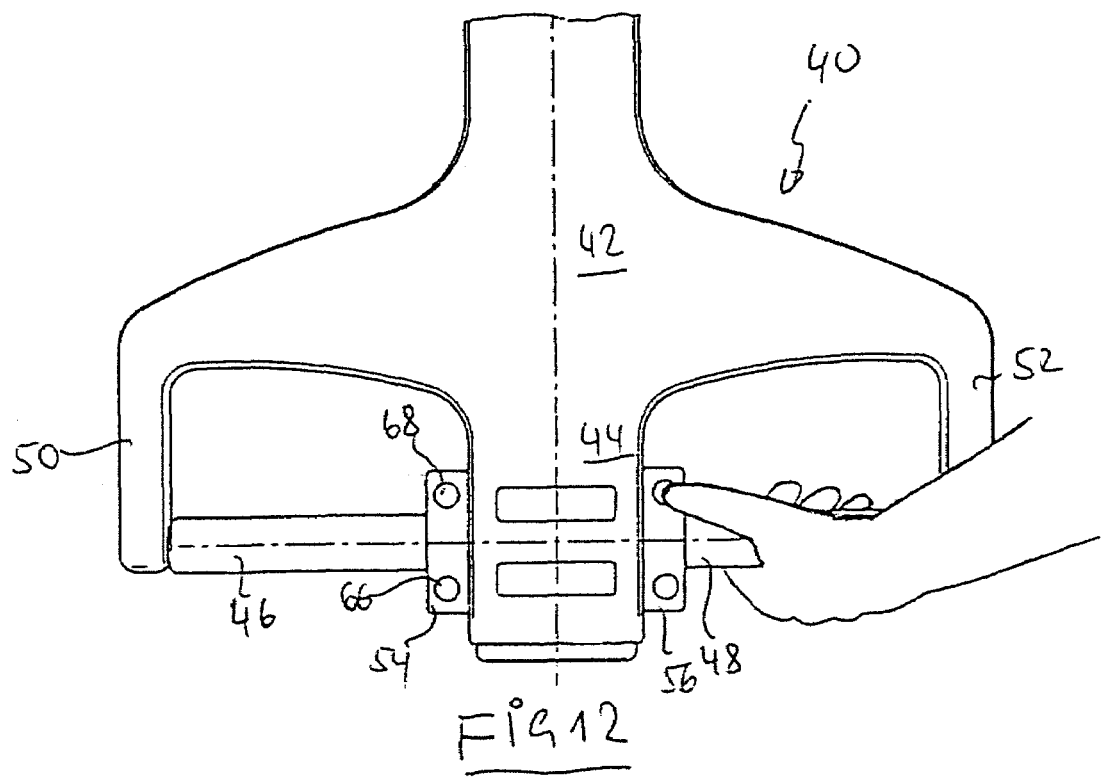
FIG. 12 shows the steering head of FIG. 2 for the actuation of the lowering function during riding operation and FIG. 13 shows a similar illustration as FIG. 12 for the raising function.

In FIGS. 10 and 12 the vertical orientation of the steering arm or the steering head 40, respectively, is shown, with the right hand grasping grip portion 58 in walking operation. In FIGS. 10 and 11 the lower side of the steering head 40 can be seen as well as the lower side of rocker 54, 56. In FIG. 10 the thumb of the hand engaging grip portion 58 engages the associated rear lower side (portion 64 in FIG. 3) in order to effect a lowering function. In FIG. 11 the thumb presses against the inner lower side of rocker 56 i.e. against the inner end in FIG. 3 in the direction of arrow 70 in order to effect the raising function of the load bearing means.

Figure 13:
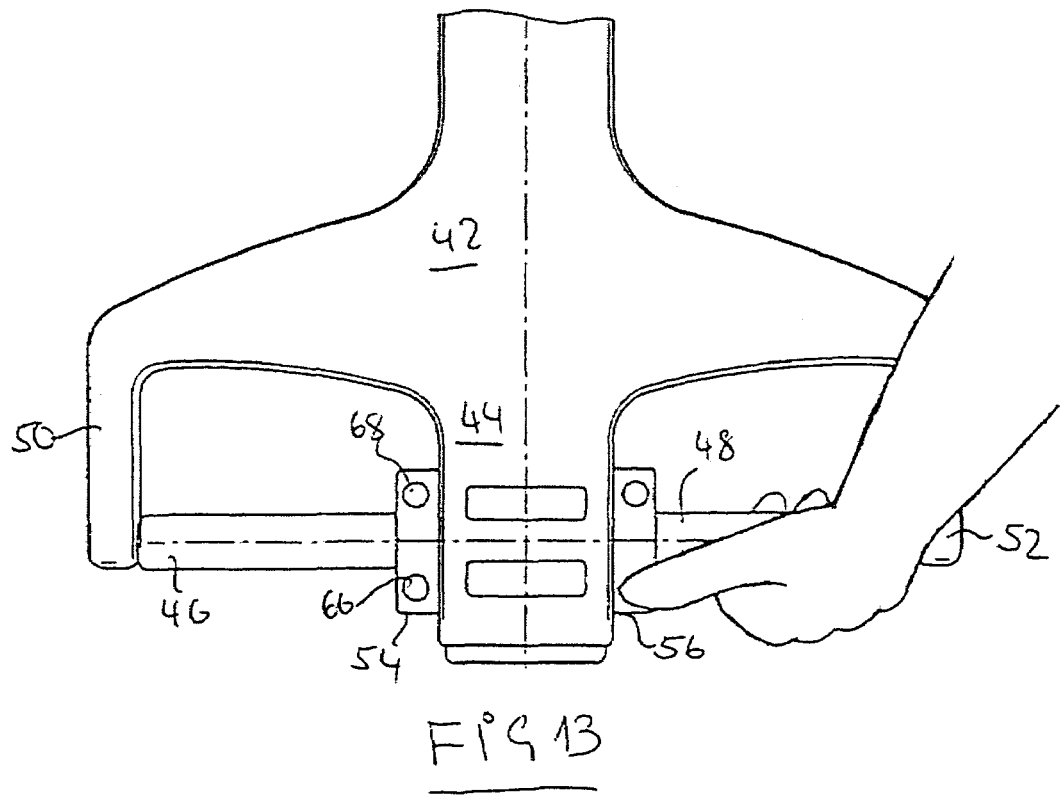

In FIGS. 12 and 13 the handling and actuation of steering head 40 is shown for the riding operation. It is shown how the left hand of the operator engages grip portion 51 while he stands on the right side of platform 14 in FIG. 1. Concurrently he seizes the retaining bail 74 with his right hand. In FIG. 12 the thumb of the left hand actuates rocker 58 on the upper side of the front actuation surface in order to effect the lowering function (see FIG. 3). In FIG. 13 the thumb of the left hand presses from above on rocker 56 in the area of actuation surface 66 in order to effect a raising function. From the figures it can be seen that the thumb of left hand in FIGS. 12 or 13 may also engage rocker 56 from the lower side.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

What is claimed is:

1. A steering arm for a walkie/rider truck, comprising a truck body, a driving motor, a load bearing means, a platform for an operator, the steering arm including a steering rod having a lower end which for steering purposes is supported by the truck body for rotation about a vertical and a horizontal axis, a steering head which has an upper and a lower side, the steering head being symmetrical with respect to the longitudinal axis of the steering rod, the head having a transverse portion, a horn portion connected to the transverse portion, the horn portion having an upper and lateral surfaces, and grip portions on both sides of the horn portion, the grip portions extending approximately perpendicular to the horn portion in spaced relation to the transverse portion, each grip portion between the horn portion and a respective leg portion attached to the transverse portion being supported for rotation about a longitudinal axis thereof for controlling a control device for the driving motor, button portions extending on both lateral sides of the horn portion adjacent thereto above the gripping portions, the button portions extend approximately parallel to the associated lateral sides of the horn portion and are supported for pivoting movement about an approximately horizontal axis, the button portions are arranged such that they are adapted to be actuated by the thumb or the index finger of a hand grasping the associated grip portion, the button portions each having an end which extends beyond the grip portions such that they can be also actuated from the lower side of the steering head by the thumb and the index finger, the button portions being biased into a neutral position by a spring and a switch arrangement being associated with the button portions which are actuated by the pivoting of the button portions to control a raising or lowering control.

2. The steering arm of claim 1, wherein the pivoting axis of the button portions is close to the rotation axis of the associated grip portion.

3. The steering arm of claim 1, wherein the button portions are part of a rocker having a pivoting axis adjacent to the rotation axis of the associated grip portion and a spring biases the rocker into an intermediate neutral position.

4. The steering arm of claim 3, wherein the rocker is defined by an elongated lever having an upper side approximately planar and a lower side which between the ends is concave and has convex portions in lateral view at the ends thereof.

5. The steering arm of claim 3, wherein each button portion or each rocker, respectively, is associated with the switch arrangement which are located on the lateral surface of the horn below and/or above the button portions or the rocker, respectively.

6. The steering arm of claim 1, wherein the switch arrangement is located within the horn portion and can be actuated by a shaft.

7. The steering arm of claim 1, wherein the upper side of the button portions is positioned somewhat below the upper side of horn portion.

8. The steering arm of claim 1, wherein the upper side or the lower side of the button portions have actuation surfaces for the thumb or the index finger, respectively.

9. The steering arm of claim 1, wherein the gripping portions on both sides of the horn portion extend obliquely outwardly downwardly.

10. A steering arm for a truck, comprising:

a truck body;

a driving motor;

a load bearing device;

a platform for an operator;

the steering arm including a steering rod having a lower end which is supported by the truck body for rotation about a vertical and a horizontal axis;

a steering head which has an upper and a lower side, the steering head being symmetrical with respect to the longitudinal axis of the steering rod, the head having a transverse portion, a horn portion connected to the transverse portion, the horn portion having an upper and lateral surfaces;

and grip portions on both sides of the horn portion, the grip portions extending approximately perpendicular to the horn portion in spaced relation to the transverse portion, each grip portion between the horn portion and a respective leg portion attached to the transverse portion being supported for rotation about a longitudinal axis thereof for controlling a control device for the driving motor;

button portions extending on both lateral sides of the horn portion adjacent thereto above the gripping portions, the button portions extend approximately parallel to the associated lateral sides of the horn portion and are supported for pivoting movement about an approximately horizontal axis, the button portions are arranged such that they are adapted to be actuated by the thumb or the index finger of a hand grasping the associated grip portion, to control a raising or lowering control.

* * * * *